March 8, 1966 A. J. MEAGHER 3,239,000
SOLAR WATER HEATER AND PROCESS OF FORMING SAME
Filed Feb. 24, 1964
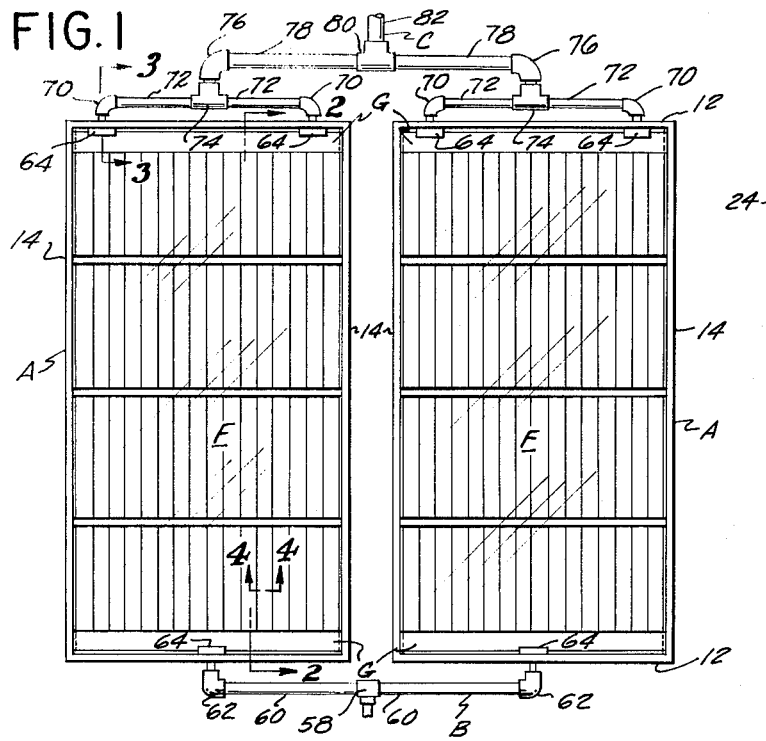
FIG.1
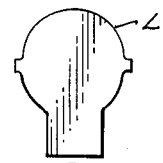
FIG.3
FIG.5
FIG.2
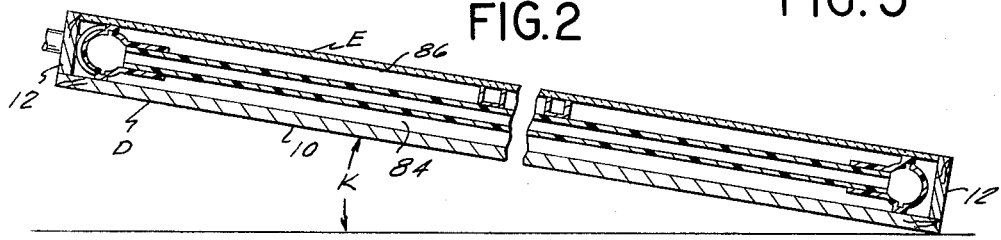
FIG.4
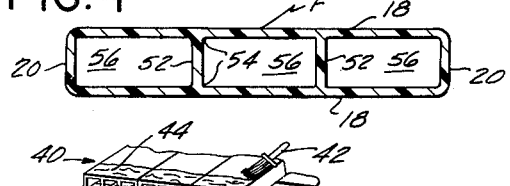
FIG.6
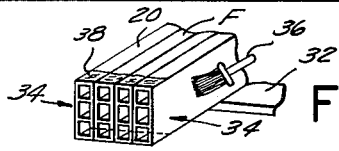
FIG.7
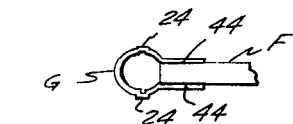
FIG.8
FIG.9 FIG.10
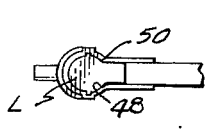
INVENTOR.
ANTHONY J. MEAGHER
BY
William C. Babcock
ATTORNEY United States Patent Office 3,239,000
Patented Mar. 8, 1966

3,239,000
SOLAR WATER HEATER AND PROCESS OF FORMING SAME
Anthony J. Meagher, 3319 Keys Lane, Anaheim, Calif.
Filed Feb. 24, 1964, Ser. No. 346,978
11 Claims. (Cl. 165—46)

The present invention relates generally to the field of solar water heaters, and more particularly to a solar water heater adapted for heating water in a swimming pool, and a process of producing the heater.

During the past few years, the number of residential swimming pools that have been installed has increased tremendously. The majority of these pools have been installed with gas-operated heaters to prolong the period during the year in which the pools can be used comfortably. One disadvantage of such heaters is that they are extremely expensive to operate, whereby many heaters are not used for their intended purpose.

A major object of the present invention is to provide a solar water heater for swimming pools that may be fabricated from preformed plastic components, is simple and easy to install, and due to the character of the material from which it is fabricated, the heater is not subject to corrosion or deterioration after use for a prolonged period of time.

Another object of the invention is to supply a solar water heater that requires little or no maintenance, is automatic in operation, and one that eliminates costly heater bills.

A further object of the invention is to provide a solar water heater that can be produced by a novel process from molded and extruded plastic components without the use of extensive plant facilities, and can, if desired, be sold in a kit form for assembly by the purchaser.

Yet another object of the invention is to furnish a solar water heater which includes a number of tubular sections of substantial width having at least one longitudinally extending partition in each one thereof, which serves the dual function of reinforcing the sections against deformation, and also operates as a heat exchange element to improve the efficiency of the heater.

Still a further object of the invention is to provide a solar water heater that divides the water flowing therethrough into a number of streams of relatively small transverse cross section to obtain optimum heat exchange between the heater and flowing water, which is accomplished without the use of small tubes as has been necessary in previously available solar water heaters.

These and other objects and advantages of the present invention will become apparent from the following description thereof, and from the accompanying drawing illustrating the same, in which:

FIGURE 1 is a top plan view of the solar water heater connected to a water inlet and outlet;

FIGURE 2 is a longitudinal cross-sectional view of the device, taken on the line 2—2 of FIGURE 1;

FIGURE 3 is a fragmentary cross-sectional view of the heater, taken on the line 3—3 of FIGURE 1;

FIGURE 4 is a transverse cross-sectional view of one of the rectangular tubular sections, taken on the line 4—4 of FIGURE 1;

FIGURE 5 is a plan view of one of the inserts used in closing one of the ends of the headers;

FIGURE 6 illustrates a first step in the fabrication of one of the solar water heaters;

FIGURE 7 illustrates a second step in the fabrication of one of the solar water heaters;

FIGURE 8 illustrates a third step in the fabrication of one of the solar water heaters;

FIGURE 9 illustrates a fourth step in the fabrication of one of the solar water heaters; and FIGURE 10 illustrates a fifth step in the fabrication of one of the solar water heaters.

With continuing reference to the drawing for the general arrangement of the present invention, it will be seen in FIGURE 1 that two of the solar water heaters A are disposed in side-by-side relationship. The heaters A are preferably angularly disposed relative to the horizontal such as being supported on an inclined roof, or the like (not shown), with the degree of angulation being so selected that the heaters are disposed at right angles to the sun's rays during the period of the year when maximum heating of the water passing through the heaters is required.

Water is supplied to the lower ends of the heaters A from a pipe B, with the water flowing upwardly through the heaters to discharge into a pipe C to be returned to the pool (not shown) by the force of gravity. Pipe B is connected to the discharge side of a pump (not shown) that is normally provided to recirculate water from and to a pool. As it is recirculated, the water passes through a filter (not shown) as well as a gas-operated heater. When the solar water heaters A are used, the gas heater (not shown) is bypassed by a conventional piping arrangement, and the gas heater is only used when an auxiliary source of heat is required to bring the temperature up to a desired degree.

Each solar water heater A includes a box D that is defined by a bottom 10, two end walls 12, and two side walls 14. A pane of glass, or other transparent material E preferably covers the top of box D, and is supported on a number of transverse rigid members 16, the ends of which rest on cut-out portions of the side walls 14.

A number of tubular sections F are provided for each of the solar water heaters A, which are preferably formed of a polymerized resin material impregnated with carbon black. The sections F are conveniently formed by extruding the plastic material. One material which has been found satisfactory for this particular purpose is acrylonitrile-butadiene-styrene, which is sold commercially as ABS. Each of the sections F, as can best be seen in FIGURE 4, includes two parallel side walls 18 and end walls 20.

Two headers G are provided for each of the solar water heaters A, which comprise an elongate member formed from a polymerized resin, rubber, or like material, having the transverse cross section shown in FIGURE 3. In transverse cross section the header G includes a circular portion 22 having two diametrically opposed ribs 24 projecting therefrom. Two spaced, parallel flanges 26 project outwardly from portion 22 in a direction normal to ribs 24, with the flanges being in communication with a longitudinally extending opening 28 formed in circular portion 22. The flanges 26 are spaced apart a distance 30, which is substantially the same as the distance between the exterior surfaces of side walls 18.

The process of assembling the sections F and headers G to form a part of a solar water heater A includes the steps of cutting a number of sections of the same length, and placing them in side-by-side abutting contact to rest on a flat surface 32, in the manner shown in FIGURE 6. The sections F are then pressed together in the direction indicated by tthe arrows 34, by clamps or other means (not shown). A brush 36 is thereafter employed to apply an elongate film of waterproof adhesive 38 to the extremities of the end walls 20, as also illustrated in FIGURE 6.

After films of adhesive 38 have been applied to both ends of sections F, as above described, the sections are supported on their side walls 18 on surface 32, as shown in FIGURE 7, and pressure is applied thereto in the direction indicated by arrows 40, whereby portions of the film 38 bond the sections F together and the sections define a panel of substantial width.

A brush 42 (FIGURE 7) is utilized to apply an elongate film 44 of an adhesive to the extremities of the side walls 18. End portions of the sections F are then slidably inserted in the headers G, as shown in FIGURE 8, with the films 44 on the ends of the sections being disposed in the circular portions 22 of the headers G. Headers G and sections F are thereafter moved longitiudinally relative to one another to place the films 44 inside the flanges 26. As this relative movement of the headers G and sections F takes place, the film 44 is spread over the interior surfaces of flanges 26. After the adhesive films 44 have set, the headers G and sections F are firmly held together as an integral unit.

In the step of moving the sections F and headers G relative to one another, this movement must be restricted longitudinally to such a degree that the headers and sections will fit within the box D, as shown in FIGURE 2. Sections F must be sufficiently wide that when arranged as panels and engaging headers G (FIGURE 1), spaces 48 will be left at the ends of the headers in which inserts L, as shown in FIGURE 5, can be placed. The inserts L are bonded by a film 50 of waterproof adhesive to the ends of the headers G to close the same. The film 50 also extends to seal the spaces between inserts L and the outer surface portions of the end walls 20 adjacent thereto.

Two transversely spaced, longitudinally extending partitions 52 are formed as an integral part of each section F, as may best be seen in FIGURE 4. The partitions 52 and side walls 18 meet at curved junctions 54 to minimize the possibility of cracking at these localities. The sections F are preferably formed by extruding a plastic or rubber material containing carbon black, which material can be the same as used in forming the headers G. The partitions 52, side wall 18 and end walls 20 cooperatively define a number of longitudinally extending passages 56 through which water flows from the lower pipe B to the upper pipe C (FIGURE 2) to be heated by solar energy.

From experience it has been found that sections F three inches wide and 5/16 inch high operate quite satisfactorily when formed from ABS, and the thickness of the walls 18 and 20 and partitions 52 are .051 inch. The partitions 52 serve a two-fold purpose; first to reinforce the sections F against longitudinal deformation when disposed as shown in FIGURE 2, and second, to provide additional surface area from which heat may be transferred to the water flowing through passages 56.

The pipe B (FIGURE 1) includes a T 58 that is connected to the discharge from the pump (not shown), and to two laterals 60 which extend to two L's 62. The L's 62 are connected to two saddles 64, semicircular portions 66 of which are bonded by adhesive, or other means, to the lower headers G, and in alignment with transverse bores 68 formed in the header, as best seen in FIGURE 3.

Two saddles 64 are bonded to each upper header G (FIGURE 1) which are in communication with bores 68 formed therein. Each saddle 64 is connected to an L fitting 70 from which a lateral 72 extends to a T 74. Each T 74 is connected to an L 76 having a second lateral 78 extending to a second T 80. The T 80 is connected to a line 82 which returns the water that has been heated by solar energy to the swimming pool (not shown). Portions of the saddles 64 project through downwardly extending recesses 84 formed in walls 12 of box D, as best seen in FIGURE 2.

The combined transverse cross section of the two bores 68 formed in one of the upper headers G is greater than that of the single bore 68 formed in the header G therebelow. Likewise, the combined transverse cross section of the pipe and fittings leading from the saddles 64 on each of the upper headers G is greater than the transverse cross section of the L 62 and saddle 64 connecting the same to the lower header G. Also, the transverse cross-section of each of the L's 76 and second laterals 78 is greater than the cross section of the bore 68 in one of the lower headers G.

The internal transverse cross section of T 74 and line 82 is at least twice as great as that of one of the second laterals 78. Due to the selection of the internal transverse cross sections just mentioned, water can flow from the two heaters A faster than it is discharged therein through the two laterals 60, whereby the only internal pressure to which the sections F are subjected is that of the hydrostatic head of the water therein.

After the solar water heater has been assembled in the manner described, it is supported at an angle K relative to the horizontal by conventional means (not shown) in a position where it is fully exposed to the sun. The angle K selected is preferably one that most nearly places the upper surfaces of the sections F, when arranged as panels, in a direction normal to that of the sun's rays in the particular geographical area in which the heater is installed during the period of the year when maximum heating of the swimming pool is desired.

In the Los Angeles, California, area, for example, the angle K can vary from 79° relative to the horizontal on June 21st, to 33° relative to the horizontal on December 21st. These angles are for optimum results. In some instances, less than the angle K will be used in an installation to adapt the support of the heaters A to an existing structure. When such an installation is made, it must be realized that the heaters A are not operating at maximum efficiency, and additional area of sections F must be provided to compensate for this lowered efficiency.

The use and operation of the invention is quite simple. After the heater has been installed and pipe in the manner shown in Figures 1 and 2, it is ready for operation. Water is discharged into the lower headers G and rises in the sections F to ultimately flow back to the pool (not shown) through the line 82.

The glass pane E cooperates with the box D to provide a confined space 84 that is filled with air. Rays (not shown) from the sun pass through the pane E to heat the blanket of air that is in contact with the under surfaces of the headers G and sections F, as can best be seen in FIGURE 2, and serves to heat the same.

Upon entering each of the sections F, the water is divided into three upwardly moving columns due to the positioning of the partitions 52 relative to the walls 18 and 20. As water enters the lower ends of the sections F there is a maximum differential in temperature between it and the side walls 18 and end walls 20. The rate of heat transfer from the lower end portions of the sections F and lower header G is at a maximum, and decreases as the water becomes warmer as it rises in the sections.

Partitions 52 form an integral part of each section F, and are heated by the transfer of heat from the side walls 18 thereto. The heated partitions 52 also transfer heat to the water flowing upwardly in the sections in the same manner as the side walls 18 and end walls 20 transfer heat thereto. It will be apparent that the above described operation is continuous, with the upwardly positioned side walls 18 being directly heated by the sun's rays (not shown) from which this heat is transferred to the upwardly moving streams of water in the sections F.

The blanket of air 86 continues to be constantly heated by the sun's rays, and maintained at a substantially constant temperature, even though it is continuously transferring a part of its heat content to those parts of the sections F with which it is in contact. The end walls 20 of the sections F that are in abutting contact serve to transfer heat by conduction to water flowing through the device in the same manner as the partitions 52.

Although the present invention is fully capable of achieving the objects and providing the advantages hereinbefore mentioned, it is to be understood that it is merely illustrative of the presently preferred emodiments thereof and I do not means to be limited to the details of con-

I claim:
1. A method of producing a solar water heater, including:
    (a) forming an elongate tubular member having two longitudinally extending parallel flanges projecting outwardly therefrom and situated on opposite sides of a longitudinally extending opening in said member;
    (b) forming an elongate tube of rectangular transverse cross section;
    (c) cutting said tube to provide a plurality of sections thereof of substantially the same length;
    (d) clamping said sections together a first time with the sides thereof in abutting contact;
    (e) applying a waterproof adhesive to the top and bottom end surfaces of said clamped sections;
    (f) unclamping said sections;
    (g) clamping said sections together a second time with said adhesive-covered ends in abutting contact;
    (h) applying a waterproof adhesive to the top and bottom side surfaces of said sections adjacent the ends thereof;
    (i) cutting said tubular member to provide two headers, each of which is sufficiently long to accommodate those of said sections therebetween which have been clamped together a second time;
    (j) inserting said adhesive-covered top and bottom side surfaces between said flanges;
    (k) releasing said sections from said second clamped position;
    (l) forming closures for slidably engaging the ends of said headers; and
    (m) bonding said closures into the ends of said headers.

2. A method as defined in claim 1 which includes the further steps of:
    (a) drilling a water inlet opening in one of said headers and a plurality of water outlet openings in the other of said headers;
    (b) forming a plurality of tubular water conducting members; and
    (c) bonding a plurality of said water conducting members to said headers in such positions thereon that said water conducting members are in communication with said inlet and outlet openings.

3. A method as defined in claim 1 wherein said tubular member is formed by extruding a polymerized resin impregnated with carbon black.

4. A method as defined in claim 1 wherein said tube is formed by extruding a polymerized resin impregnated with carbon black.

5. A method as defined in claim 1 wherein said tube is formed with at least one longitudinally extending partition therein to provide a plurality of channels in the interior of said tube through which water can flow.

6. A solar water heater, including:
    (a) an upper header and a lower header that are parallel and in vertical alignment, with said upper and lower headers each having two spaced parallel flanges projecting therefrom, which flanges are situated on opposite sides of a longitudinally extending opening formed in each of said headers, with said upper and lower headers being so disposed that said flanges extend toward one another;
    (b) a plurality of tube sections of substantially the same length and rectangular in transverse cross section, which sections are adapted to be disposed in side-by-side abutting contact to provide a panel, said upper and lower headers being sufficiently large in cross section to support said tube sections in said panel above a surface on which said upper and lower headers rest;
    (c) means for bonding the abutting end portions of said sections together with a watertight seal;
    (d) means for bonding the end portions of said sections, when disposed to define said panel between said flanges on said upper and lower headers and in a water-tight seal therewith;
    (e) means for closing the ends of said headers;
    (f) a tubular water inlet;
    (g) means for holding said tubular water inlet on said lower header and in communication with an opening formed therein;
    (h) a plurality of tubular water outlets;
    (i) means for holding said water outlets on said upper header in communication with a plurality of openings formed therein; and
    (j) a plurality of longitudinally extending partitions in said tube sections which reinforce the same against deformation and cooperate therewith to define a plurality of channels therein through which water can flow.

7. A solar water heater as defined in claim 6 wherein each of said tubes and partitions is fabricated from a polymerized resin impregnated with carbon black.

8. A solar water heater as defined in claim 7 wherein the upper and lower walls and side walls of each of said tubes are of maximum thinness to provide maximum heat transfer therethrough, yet with the thickness thereof, together with that of said partitions being such that said tubes are sufficiently strong to be self-supporting when extending between said headers.

9. A solar water heater as defined in claim 7 wherein said means for bonding the abutting end portions of said sections between said panels is a waterproof adhesive.

10. A solar water heater as defined in claim 7 wherein said means for bonding end portions of said sections between said panels is a waterproof adhesive.

11. A solar water heater as defined in claim 7 wherein said means for closing the ends of said headers comprise:
    (a) a plurality of plates, each of which is of such configuration as to be slidably yet snugly insertable in an end of one of said headers; and
    (b) a waterproof adhesive for bonding said plates to the interior end surfaces of said headers to close the ends of said headers.

References Cited by the Examiner

UNITED STATES PATENTS

| | | | |
|---|---|---|---|
| 1,042,418 | 10/1912 | Evans | 126—271 |
| 1,258,405 | 3/1918 | Harrison | 126—271 |
| 2,521,475 | 9/1950 | Nickolas | 165—175 X |
| 3,022,781 | 2/1962 | Androssy | 126—271 |

FOREIGN PATENTS

| | | |
|---|---|---|
| 724,819 | 1/1932 | France. |
| 822,768 | 10/1959 | Great Britain. |
| 340,987 | 10/1959 | Switzerland. |

FREDERICK L. MATTESON, Jr., *Primary Examiner.*

CHARLES J. MYHRE, *Examiner.*